United States Patent
Wang et al.

(10) Patent No.: US 9,735,905 B2
(45) Date of Patent: Aug. 15, 2017

(54) SYSTEMS AND METHODS FOR IMPLEMENTING BI-DIRECTIONAL SYNCHRONIZATION PROPAGATION

(71) Applicant: BROADCOM CORPORATION, Irvine, CA (US)

(72) Inventors: Peiqing Wang, Laguna Beach, CA (US); Linghsiao Wang, Irvine, CA (US); Mehmet Vakif Tazebay, Irvine, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 501 days.

(21) Appl. No.: 13/716,463

(22) Filed: Dec. 17, 2012

(65) Prior Publication Data
US 2014/0044133 A1 Feb. 13, 2014

Related U.S. Application Data

(60) Provisional application No. 61/682,132, filed on Aug. 10, 2012.

(51) Int. Cl.
*H04J 3/06* (2006.01)
(52) U.S. Cl.
CPC .......... *H04J 3/0697* (2013.01); *H04J 3/0658* (2013.01)
(58) Field of Classification Search
None
See application file for complete search history.

(56) References Cited

U.S. PATENT DOCUMENTS

| | | | | |
|---|---|---|---|---|
| 5,852,631 | A * | 12/1998 | Scott | 375/222 |
| 2002/0085719 | A1* | 7/2002 | Crosbie | 380/248 |
| 2002/0145980 | A1* | 10/2002 | Morley | H04W 84/20 370/244 |
| 2005/0143046 | A1* | 6/2005 | Suzuki | H04W 84/20 455/343.2 |
| 2008/0225841 | A1* | 9/2008 | Conway et al. | 370/389 |
| 2009/0097469 | A1* | 4/2009 | Lee | 370/350 |
| 2009/0203403 | A1* | 8/2009 | Gidron et al. | 455/557 |
| 2010/0054137 | A1* | 3/2010 | Deng et al. | 370/247 |
| 2010/0329108 | A1* | 12/2010 | Diab et al. | 370/216 |
| 2011/0150008 | A1* | 6/2011 | Le Pallec et al. | 370/503 |

(Continued)

*Primary Examiner* — Brian D Nguyen
*Assistant Examiner* — Ashil Farahmand
(74) *Attorney, Agent, or Firm* — McDermott Will & Emery LLP

(57) ABSTRACT

Systems and methods for implementing bi-directional synchronization propagation between first and second communication devices are provided. The devices are arranged in a loop-timing configuration. A method includes detecting, by the second communication device, a switching signal comprising an indication to switch a timing role of the second communication device and engaging, by the second communication device, in a synchronization handshake with the first communication device over a communication link based on the detection of the switching signal. Engaging in the synchronization handshake includes determining whether the first communication device is configured to support bi-directional synchronization propagation. The method includes switching the timing role of the second communication device based on the synchronization handshake.

20 Claims, 7 Drawing Sheets

(56) References Cited

U.S. PATENT DOCUMENTS

2011/0170645 A1\* 7/2011 Barnette et al. .............. 375/376
2011/0305165 A1\* 12/2011 Wang et al. .................. 370/254
2012/0287948 A1\* 11/2012 Ruffini et al. ................. 370/503

\* cited by examiner

SYSTEMS AND METHODS FOR IMPLEMENTING BI-DIRECTIONAL SYNCHRONIZATION PROPAGATION

CROSS-REFERENCES TO RELATED APPLICATIONS

The present application claims the benefit of U.S. Provisional Patent Application Ser. No. 61/682,132, entitled "Systems and Methods for Enabling Bi-Directional Synchronization Propagation," filed on Aug. 10, 2012, which is hereby incorporated by reference in its entirety for all purposes.

FIELD

The subject technology generally relates to synchronization propagation and, in particular, relates to systems and methods for implementing bi-directional synchronization propagation.

BACKGROUND

Due to Ethernet's simplicity and low cost, Ethernet has become a dominant technology for data transmission, particularly for telecommunication and wireless providers. Ethernet typically provides asynchronous communication, where data may be transmitted without the use of an external clock signal and may be transmitted intermittently rather than in a steady stream. The asynchronous nature of Ethernet provides certain transmission challenges. For example, other synchronous communication services such as time division multiplexing (TDM) services may be incompatible with Ethernet due to Ethernet's asynchronous nature.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
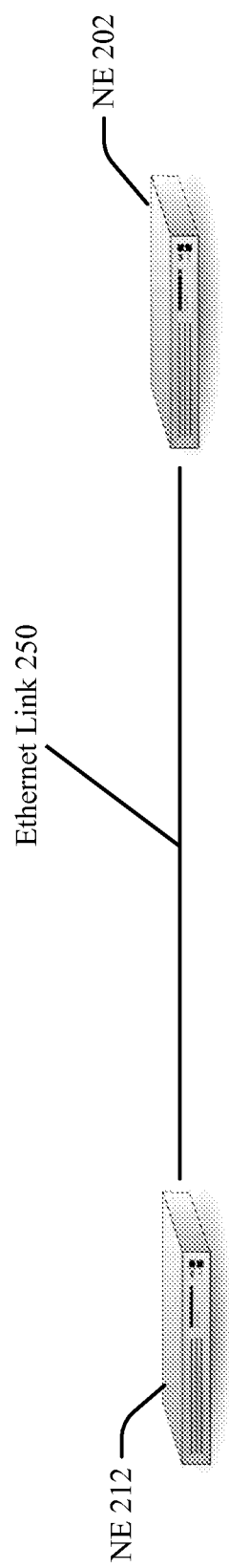
FIG. 1 illustrates an example of a network of network equipment connected over Ethernet links, in accordance with various aspects of the subject technology.

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

TDM services such as T1/E1 and synchronous optical networking (SONET)/synchronous digital hierarchy (SDH) may require synchronized clocks at both source and destinations nodes. Similarly, wireless base stations may require synchronization to a common clock to ensure a smooth call hand-off between adjacent cells. Synchronous Ethernet (SyncE) provides a mechanism to pass timing from node to node over an Ethernet physical layer in the same way timing is passed in SONET/SDH or T1/E1, thereby giving telecommunication and wireless providers confidence that networks based on SyncE will not only be cost-effective, but also as reliable as SONET/SDH and T1/E1 based networks.

SyncE architectures are described in International Telecommunication Union Telecommunication Standardization Sector (ITU_T) Recommendations (e.g., G.8261 and G.813). Aspects of SyncE network equipment (NE) for distribution of synchronization include: 1) having a clock with a defined quality compatible with SONET/SDH; 2) being able to recover timing from one or several Ethernet signals; 3) being able to deliver timing to Ethernet signals; and 4) being able to select timing from several reference clock inputs as the redundancy requirement for network protection. For SyncE, passing synchronization at a physical layer can be achieved by deriving network timing from a recovered clock, which can then be made traceable to an external source such as a network clock or a primary reference clock (PRC).

In SyncE, delivery of timing is bi-directional, such as between two physical layer nodes (PHYs) in which one is currently a master and the other is currently a slave. The NE of SyncE can switch its reference clock from the recovery clock to one or more external clock sources. Once switching to an external PRC is complete, for example, the PHY that used to be a slave can transmit its data using the new external clock source instead of its recovery clock. On the other hand, its link partner, which was the master before, now needs to recover the clock from its receiving data at its receiver. The master and slave roles can therefore be reconfigured in SyncE.

Gigabit Ethernet PHYs (GPHYs), on the other hand, use loop-timing (e.g., a fixed master/slave arrangement) to recover timing. The master generates a transmit clock locally from a free-running crystal oscillator, and the slave recovers this clock from data received from the master and uses this recovered clock to transmit its own data. Thus, based on the current loop-timing architecture of GPHYs, transport synchronization is unidirectional. That is, the timing can only be delivered from the master to the slave. In particular, under the asymmetric nature of the frequency tracking capability of the current GPHY loop-timing, only the slave can recover and track the frequency, and the master will always assume that both its transmit clock and received clock are frequency locked to an external reference clock. While this loop-timing configuration works well for traditional Ethernet architecture, it may not meet the requirement for timing delivery for SyncE. According to various aspects of the subject technology, systems and methods are provided for adapting gigabit Ethernet to a SyncE implementation.

According to certain aspects, in order to make sure that an Ethernet device can deliver the timing from an external clock source, a new architecture for loop-timing is provided such that the Ethernet device, regardless of its initial configuration as a master or a slave, is capable of tracking the frequency from its down-link data streams when a link is already established. Thus, after an initial link between two Ethernet devices is established, either device can act as a master (e.g., a timing master) when needed. Such a new loop-timing architecture may be referred to as a dual-master mode architecture.

FIG. 1 illustrates an example of network equipment (NE) 202 and 212 communicating as link partners over Ethernet link 250, in accordance with various aspects of the subject technology. NE 202 and 212 may be routers, switches, gateways, bridges, hubs, repeaters, servers, access points, modems, and/or other communication devices. According to certain aspects, NE 202 and 212 each includes a dual-master mode architecture, thereby enabling bi-directional synchronization propagation between these network equipment. Assume, for the purposes of illustration, that NE 212 includes a physical layer device (PHY) initially configured as a master (an initial master), while NE 202 includes a PHY initially configured as a slave (an initial slave). Thus, NE 212 may be initially configured to provide synchronization information to NE 202 over Ethernet link 250. According to the dual-master mode architecture, the PHY of NE 212 may switch its timing role and become a timing slave. Furthermore, the PHY of NE 202 may switch its timing role and become a timing master. Thus, NE 202 may be reconfigured to provide synchronization information to NE 212 instead of the other way around. According to certain aspects, under the dual-master mode architecture, a switching signal may be defined. The switching signal may provide an indication to switch the timing roles of the initial master and the initial slave. Upon detection of the switching signal, a synchronization handshake between the initial master and the initial slave may be implemented to switch the timing roles for both devices. According to certain aspects, the dual-master mode architecture may be applied to the current Institute of Electrical and Electronics Engineers (IEEE) 802.3 standard.

Figure 2:
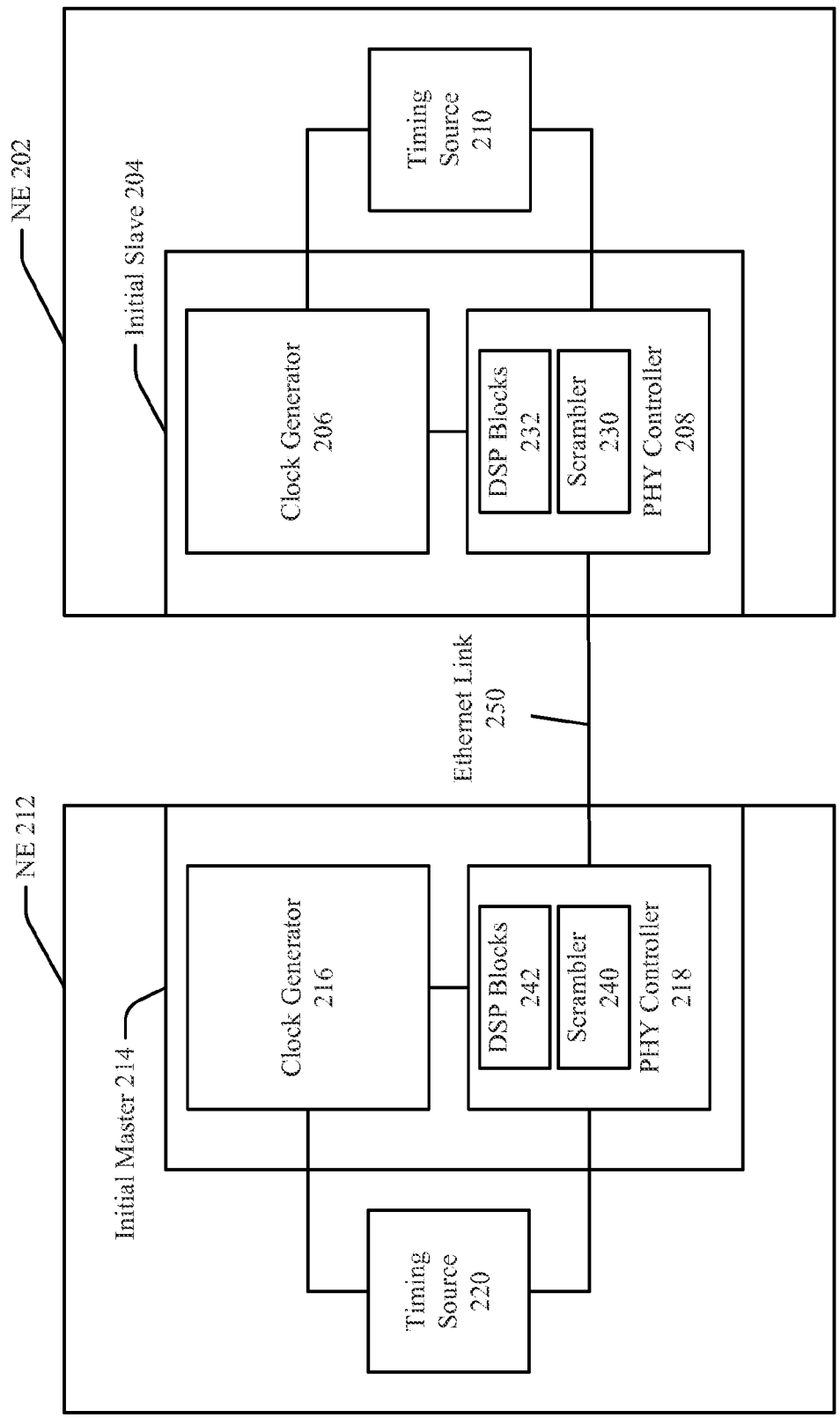
FIG. 2 illustrates an example of network equipment communicating as link partners over an Ethernet link, in accordance with various aspects of the subject technology.

FIG. 2 is a block diagram illustrating components of NE 212 and 202, in accordance with various aspects of the subject technology. NE 212 includes initial master 214 (e.g., a PHY configured as an initial master) and timing source 220. Initial master 214 includes clock generator 216 and PHY controller 218. Similarly, NE 202 includes initial slave 204 (e.g., a PHY configured as an initial slave) and timing source 210. Initial slave 204 includes clock generator 206 and PHY controller 208.

PHY controllers 208 and 218 include logic, circuitry, interfaces, and/or code that may be operable to perform various functions for supporting communications with other network equipment. According to certain aspects, PHY controllers 208 and 218 may each include a transceiver (e.g., a receiver and transmitter), a scrambler (e.g., scramblers 230, 240), a descrambler, one or more digital signal processing blocks (e.g., DSP blocks 232, 242), and/or other components for supporting communications with other network equipment. Clock generators 206 and 216 include logic, circuitry, interfaces, and/or code that may be operable to perform various functions for generating and tracking clocks. In some aspects, clock generators 206 and 216 may each include a phase-locked loop (PLL) system. Timing sources 210 and 220 include logic, circuitry, interfaces, and/or code that may be operable to perform various functions for providing switching signals to PHY controllers 208 and 218, as well as for determining reference clocks and providing these clocks to clock generators 206 and 216. In some aspects, timing sources 210 and 220 may be microcontrollers that generate reference clocks and/or receive reference clocks from other sources (e.g., from other components of network equipment 202 and 212 and/or from other network equipment).

Since initial master 214 is a PHY configured as an initial master, timing source 220 may determine a primary reference clock to use for communications by initial master 214. In this regard, timing source 220 may provide the primary reference clock to clock generator 216, which may generate a transmit clock based on the primary reference clock. PHY controller 218 may transmit signals to network equipment 202 based on the transmit clock generated by clock generator 216. Since initial slave 204 is a PHY configured as an initial slave, PHY controller 208 may receive signals from PHY controller 218 and clock generator 206 may generate a recovery clock based on the timing provided by these signals. Clock generator 206 may also generate a transmit clock based on the recovery clock. PHY controller 208 may transmit any signals back to PHY controller 218 using this generated transmit clock. This transmit clock may also be provided to timing source 210 in order to propagate the clock to other network equipment.

According to various aspects of the subject technology, the timing roles of initial master 214 and initial slave 204 may be switched. Therefore, initial master 214 may be reconfigured as a timing slave, while initial slave 204 may be reconfigured as a timing master. Aspects of the subject technology provide a synchronization handshake to switch the timing roles of initial master 214 and initial slave 204. The handshake may be used to initiate a request for timing loop switching and to acknowledge such a request if both sides support this dual-master mode.

The synchronization handshake may be applied to gigabit Ethernet communications. In some aspects, the handshake may be applied to one or more Ethernet physical layer protocols such as 1GBASE-X, 10GBASE-X, 40GBASE-X, and 100GBASE-X, where 'X' refers to any of the various physical media types set forth in the IEEE 802.3 standard. Although applying this handshake to the current IEEE 802.3 standard may involve various challenges, this process may be simplified by the use of a high quality external reference clock, which may be suitable for syncE applications that need a stable link with accurate frequency tracking. In some aspects, the high quality external reference clock may have a frequency accuracy of at least +/−4.6 parts per million (ppm). The frequency accuracy of traditional gigabit Ethernet, on the other hand, is typically +/−100 ppm, which is much lower than the accuracy of the high quality external reference clock to be used. As a result, certain protocols for gigabit Ethernet communications that use the lower frequency accuracy, such as the current IEEE 802.3 energy-efficient Ethernet (EEE) standard for gigabit Ethernet devices, would not be applicable for use with the high quality external reference clock. Thus, in accordance with certain aspects of the subject technology, the same low power idle (LPI) signaling defined by the current IEEE 802.3 EEE standard for gigabit Ethernet devices may be used for the synchronization handshake. Since the LPI signaling is well-defined and supported by the current IEEE 802.3 standard, the use of the LPI signaling may simplify the dual-master mode architecture. Furthermore, since a high quality external reference clock is used, the PHY controller of either initial master 214 or initial slave 204 can track the frequency without employing the integral loop in its digital phase-locked loop for timing recovery. Thus, the timing recovery loop can be substantially symmetrical for both initial master 214 and initial slave 204.

According to the current IEEE 802.3 standard signaling, the variable PHYC_CONFIG may be used to determine which of two PHYs communicating with one another is a master and which is a slave. This variable may be set during the auto-negotiation between the PHYs. For example, if PHYC_CONFIG=1 for one PHY, then this PHY is designated as the master. If PHYC_CONFIG=0 for the other PHY, then this PHY is designated as the slave. The use of this variable may be used with the dual-master mode architecture, including for use with physical coding sublayer functions. Thus, in the configuration as shown in FIG. 2, PHYC_CONFIG is set at 1 for initial master 214, while PHYC_CONFIG is set at 0 for initial slave 204. This variable may be set for the remainder of the communications between initial master 214 and initial slave 204. Thus, initial master 214 will remain the initial master (which may also be referred to as an 802.3 master) during the communications between initial master 214 and initial slave 204, while initial slave 204 will remain the initial slave (which may also be referred to as an 802.3 slave) during the communications between initial master 214 and initial slave 204.

According to certain aspects of the subject technology, a new variable, defined as PHYC_Timing_CONFIG, may be used to control the timing role of initial master 214 and initial slave 204. In particular, the synchronization handshake may be used to set such a variable for initial master 214 and initial slave 204. According to certain aspects, when PHYC_Timing_CONFIG=1 for either initial master 214 or initial slave 204, the timing role of this PHY will be set as a timing master. In some aspects, PHYC_Timing_CONFIG may, by default, be set to 1 if PHYC_CONFIG=1 after auto negotiation (so that communications between the two PHYs may still be compatible with the current IEEE 802.3 standard if the dual-master mode is not enabled). However, PHYC_Timing_CONFIG can be reset when the timing loop between initial master 214 and initial slave 204 is required to switch its direction. Correspondingly, when PHYC_Timing_CONFIG=0 for either initial master 214 or initial slave 204, the timing role of this PHY will be set as a timing slave. In some aspects, PHYC_Timing_CONFIG may, by default, be set to 0 if PHYC_CONFIG=0 after auto negotiation (so that communications between the two PHYs may still be compatible with the current IEEE 802.3 standard if the dual-master mode is not enabled). However, PHYC_Timing_CONFIG can be reset when the timing loop between initial master 214 and initial slave 204 is required to switch its direction.

Suppose there is a need to switch the timing loop between initial master 214 and initial slave 204, which will reverse the direction of the timing loop so that initial master 214 will become the new timing slave while initial slave 204 will become the new timing master. According to certain aspects, a new register bit, named Timing_LP_Switch, may be defined to initiate the timing loop switch. Timing_LP_Switch may be provided by timing source 220 to PHY controller 218 and/or by timing source 210 to PHY controller 208 as a switching signal to initiate the timing loop switch.

Figure 3:
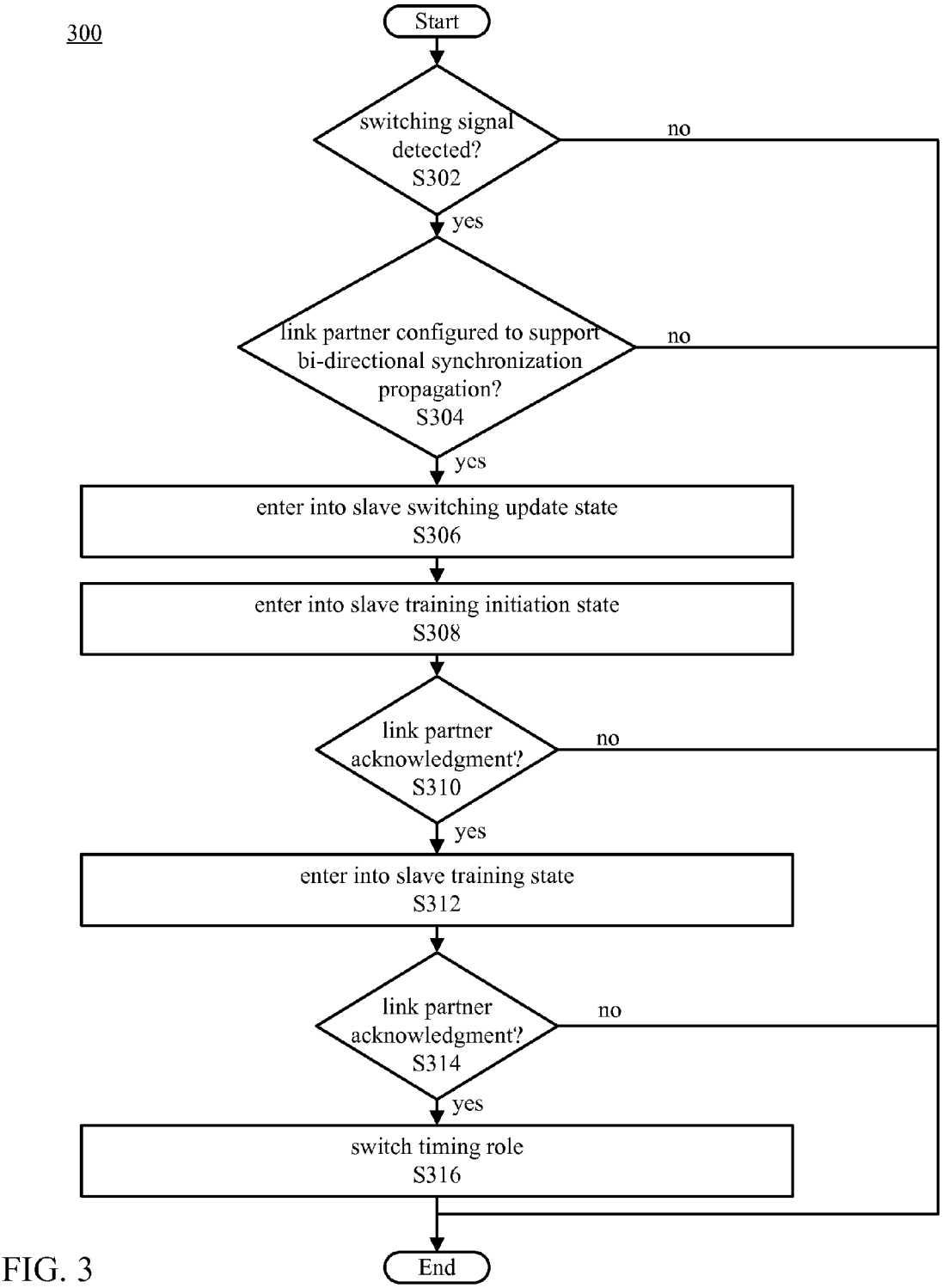
FIG. 3 illustrates an example of a method for implementing bi-directional synchronization propagation between an initial master and an initial slave, in accordance with various aspects of the subject technology.
Figure 5:
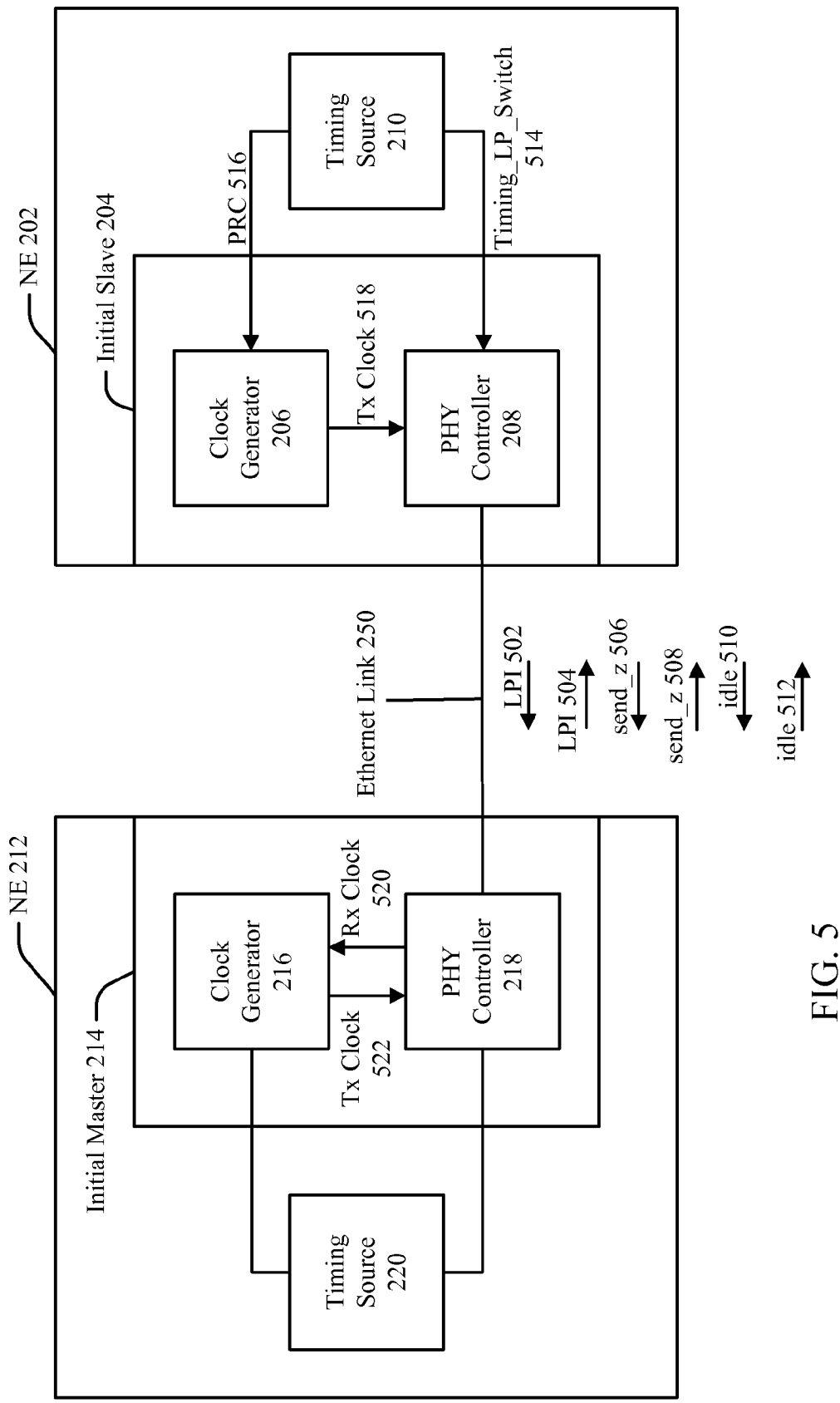
FIG. 5 illustrates an example of communications that occur between network equipment when a switching signal is asserted at an initial slave, in accordance with various aspects of the subject technology.

FIG. 3 illustrates an example of method 300 for implementing bi-directional synchronization propagation between initial master 214 and initial slave 204, in accordance with various aspects of the subject technology. In particular, method 300 may be implemented by initial slave 204 when Timing_LP_Switch is asserted locally (e.g., timing source 210 provides Timing_LP_Switch to PHY controller 208). FIG. 5 illustrates an example of communications that occur between network equipment 202 and 212 when Timing_LP_Switch 514 is asserted locally at initial slave 204, in accordance with various aspects of the subject technology. Although method 300 is described herein with reference to the examples of FIGS. 1, 2, and 5, method 300 is not limited to these examples. Furthermore, method 300 does not necessarily need to be performed in the order as shown. Based upon design preferences, it is understood that the order of method 300 may be rearranged.

According to certain aspects, PHY controller 208 detects Timing_LP_Switch 514 (S302). As discussed above, timing source 210 may provide Timing_LP_Switch 514 to PHY controller 208, which allows PHY controller 208 to detect Timing_LP_Switch 514. If PHY controller 208 does not detect Timing_LP_Switch 514, method 300 may terminate. In some aspects, if PHY controller 208 does not detect Timing_LP_Switch 514, PHY controller 208 may wait for a predetermined period of time before attempting to detect Timing_LP_Switch 514 again.

If PHY controller 208 detects Timing_LP_Switch 514, initial slave 204 may engage in a synchronization handshake with initial master 214 to switch timing roles. According to this handshake, PHY controller 208 determines whether its link partner, initial master 214, is configured to support bi-directional synchronization propagation (S304). In some aspects, PHY controller 208 may make such a determination by sending LPI signaling (shown in FIG. 5 as LPI 502 and referred to as source LPI signals since these signals originate from initial slave 204) to initial master 214. PHY controller 208 may also enable a timer when LPI 502 is sent. PHY controller 208 may determine that initial master 214 is configured to support bi-directional synchronization propagation if it receives return LPI signals (shown in FIG. 5 as LPI 504) from initial master 214 before the timer runs out of time. This signaling may be detected by PHY controller 208 as rem_lpi_req=1, which is similar to EEE symmetric handshaking using LPI. PHY controller 208 may determine that initial master 214 is not configured to support bi-directional synchronization propagation if it does not receive LPI 504 from initial master 214 before the timer runs out of time. The time set by the timer may be defined as init_lpi_wait and may be set to any value to provide a timeout. In some aspects, init_lpi_wait may be set to accommodate the round-trip delay of the LPI signals traveling along Ethernet link 250 as well as to accommodate some latency due to the implementation for detecting LPI signals (e.g., 5 microseconds (μs), 10 μs, etc.).

According to certain aspects, if PHY controller 208 determines that initial master 214 is not configured to support bi-directional synchronization propagation, method 300 may terminate. In this situation, PHY controller 208 may stop sending LPI 502 and may set a register bit to inform timing source 210 of this status. Furthermore, initial slave 204 may remain in an active state (e.g., send_idle_data as defined in the IEEE 802.3 standard) and send normal idle signals or data as usual.

If PHY controller 208 determines that initial master 214 is configured to support bi-directional synchronization propagation, initial slave 204 enters into a slave switching update state (S306). This state may be defined as SyncELPIReq, and may be similar to the UPDATE state as defined in the gigabit EEE standard (e.g., the 1 GBASE-TX EEE standard). Initial slave 204 may remain in this state for a predetermined update time, which may be defined as lpi_update_timer and can be any value such as 190 μs, for example. During this time, PHY controller 208 may continue to send LPI 502. Furthermore, PHY controller 208 may update one or more DSP blocks to prepare for the upcoming timing loop switch.

According to certain aspects, when a timeout occurs for lpi_update_timer, initial slave 204 enters into a slave training initiation state (S308). This state may be defined as WakeSilent, and may be similar to the WakeSilent state as defined in the gigabit EEE standard. When initial slave 204 enters this state, PHY controller 208 may request initial master 214 to prepare for half-duplex training by sending one or more zero signals (shown in FIG. 5 as send_z 506 and referred to as source zero signals since these signals originate from initial slave 204) to initial master 214. According to certain aspects, the half-duplex training may be used by initial master 214 to update its timing.

PHY controller 208 may receive from initial master 214 an acknowledgment as to whether initial master 214 is prepared for the half-duplex training (S310). According to certain aspects, the acknowledgment may be in the form of one or more return zero signals (shown in FIG. 5 as send_z 508) from initial master 214. If PHY controller 208 does not receive the acknowledgment within a predetermined time, which may be any value and may be defined as Send_Z_TimeOut, then PHY controller 208 may determine that initial master 214 is not prepared for the half-duplex training. In such a situation, method 300 may terminate and PHY controller 208 may set a register bit to inform timing source 210 of this status. Furthermore, initial slave 204 may return to the active state.

If PHY controller 208 receives the acknowledgment within the predetermined time, initial slave 204 enters into a slave training state (S312). This state may be defined as WakeTraining, and may be similar to the WakeTraining state as defined in the gigabit EEE standard. When initial slave 204 enters this state, initial slave 204 may change its reference clock configuration to be based on a high quality external free-running primary reference clock (shown in FIG. 5 as PRC 516) rather than on timing provided by initial master 214. In particular, clock generator 206 may receive PRC 516 from timing source 210 and generate a transmit clock (shown in FIG. 5 as Tx clock 518) based on PRC 516. PHY controller 208 may receive Tx clock 518 from clock generator 206, and may transmit one or more idle signals (shown in FIG. 5 as idle 510 and referred to as source idle signals since these signals originate from initial slave 204) to initial master 214 using Tx clock 518 to start the half-duplex training. Initial master 214 may recover its clock (shown in FIG. 5 as Rx clock 520) from a timing of idle 510. Similar to the EEE wake up process, when initial slave 204 is in the slave training initiation state, it will not update its recovery clock until its link partner, initial master 214, finishes its new timing loop update in the half-duplex training (during which initial master 214 may still be sending send_z 508). After initial master 214 finishes its half-duplex training, which may be indicated by initial master 214 sending one or more return idle signals (shown in FIG. 5 as idle 512) to initial slave 204, both of these PHYs will be in full-duplex training. At this time, initial slave 204 may start to update its new timing (e.g., mainly its recovery clock timing). According to certain aspects, the transition from half-duplex training to full-duplex training may be triggered when initial slave 204 detects remote signal energy (e.g., from idle 512) in its receiver path.

According to certain aspects, PHY controller 208 may assert a local receiver status signal, defined as loc_rcvr_status, as okay when its new timing is updated. Furthermore, PHY controller 208 may receive from initial master 214 an acknowledgment as to whether the full duplex training was successful (S314). According to certain aspects, the acknowledgment may be in the form of idle 512 from initial master 214, which may be detected as a remote receiver status signal defined as rem_rcvr_status that is asserted as being okay. If PHY controller 208 does not receive the acknowledgment within a predetermined time, which can be any value, then PHY controller 208 may determine that the training with initial master 214 was not successful. In such a situation, method 300 may terminate and PHY controller 208 may set a register bit to inform timing source 210 of this status. Furthermore, initial slave 204 may return to the active state.

If PHY controller 208 receives the acknowledgment within the predetermined time, PHY controller 208 may switch the timing role of initial slave 204 (S316). In such a situation, PHY controller 208 may set PHYC_Timing_CONFIG as 1 for initial slave 204. Thus, according to certain aspects, the timing role of initial slave 204 may be switched to a timing master if the synchronization handshake is successful.

According to certain aspects, a timer defined as timing_switch_wait_max (similar to the wake-error timer defined in the gigabit EEE standard), which may have any value, may be used for the whole timing loop switch process. This timer may be started when initial slave 204 enters the slave training initiation state. If a timeout occurs (e.g., the timer reaches the value of timing_switch_wait_max), method 300 may terminate and PHY controller 208 may set a register bit to inform timing source 210 of this status. Furthermore, initial slave 204 may return to the active state.

Figure 4:
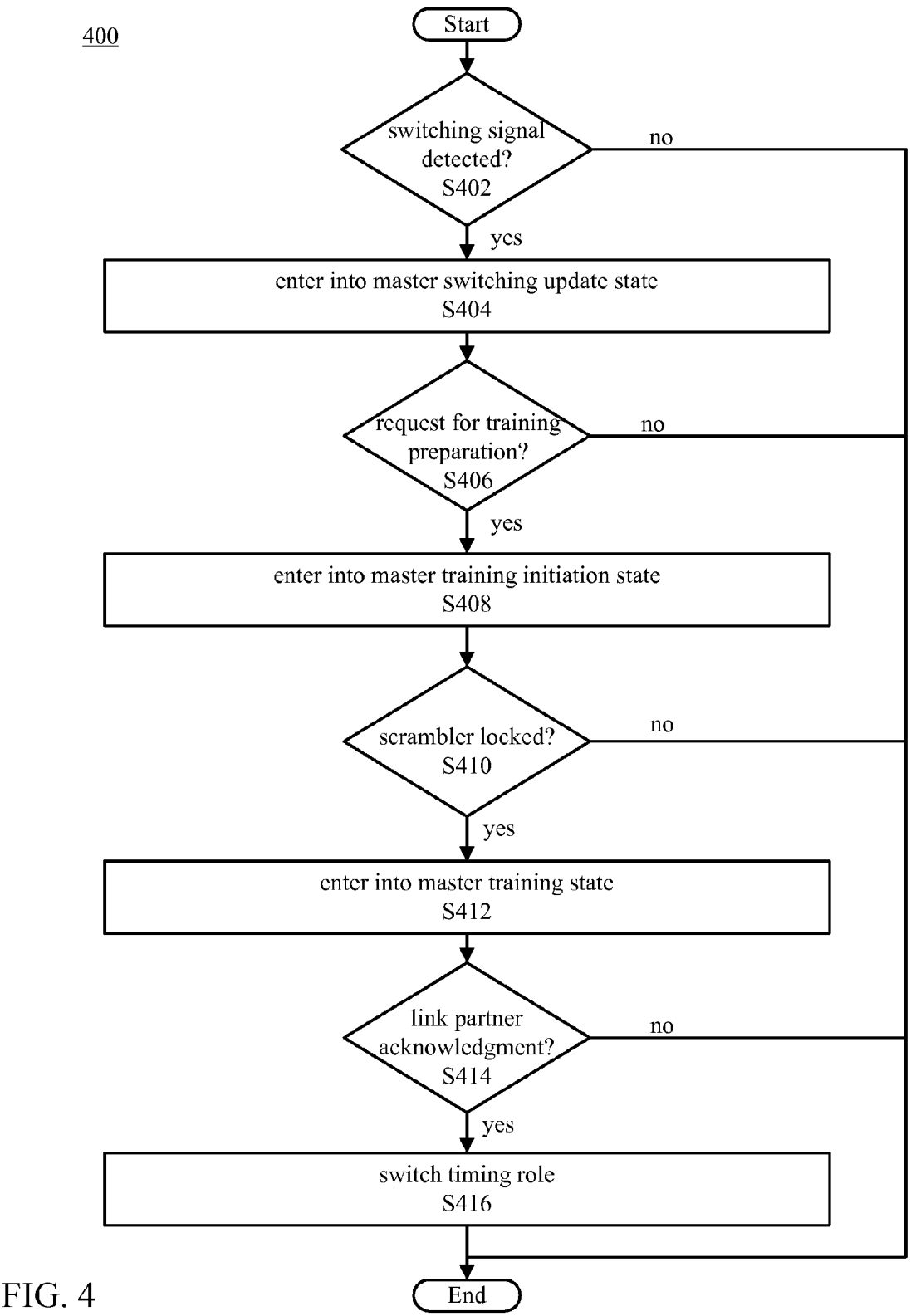
FIG. 4 illustrates an example of a method for implementing bi-directional synchronization propagation between an initial master and an initial slave, in accordance with various aspects of the subject technology.

FIG. 4 illustrates an example of method 400 for implementing bi-directional synchronization propagation between initial master 214 and initial slave 204, in accordance with various aspects of the subject technology. In particular, method 400 may be implemented by initial master 214 when Timing_LP_Switch 514 is asserted remotely (e.g., timing source 210 provides Timing_LP_Switch 514 to PHY controller 208 of initial slave 204, thereby initiating a synchronization handshake with initial master 214). This situation is still illustrated in FIG. 5. Although method 400 is described herein with reference to the examples of FIGS. 1, 2, and 5, method 400 is not limited to these examples. Furthermore, method 400 does not necessarily need to be performed in the order as shown. Based upon design preferences, it is understood that the order of method 400 may be rearranged.

According to certain aspects, initial master 214 may detect a switching signal from initial slave 204 to switch its timing role (S402). PHY controller 218 may detect this switching signal as a request from initial slave 204 to confirm that initial master 214 is configured to support bi-directional synchronization propagation. In some aspects, this request includes LPI 502, and may be detected by PHY controller 218 as rem_lpi_req=1. If PHY controller 218 does not detect the switching signal, method 400 may terminate. In some aspects, if PHY controller 218 does not detect the switching signal, PHY controller 218 may wait a period of time before attempting to detect the switching signal again.

If PHY controller 218 detects the switching signal, initial master 214 enters into a master switching update state (S404). This state may also be defined as SyncELPIReq, and may be similar to the UPDATE state as defined in the gigabit EEE standard. In this state, PHY controller 218 may send LPI 504 as confirmation that it is configured to support bi-directional synchronization propagation and may update one or more DSP blocks to prepare for the upcoming timing loop switch. Furthermore, similar to initial slave 204 in its slave switching update state, initial master 214 may remain in the master switching update state for a predetermined update time, which may be defined as lpi_update_timer and can be any value greater than lpi_update_timer of initial slave 204 (e.g., 240 μs). As a result, PHY controller 218 is allowed to detect a request from initial slave 204 for initial master 214 to prepare for half-duplex training (S406) before lpi_update_timer of initial master 214 expires.

According to certain aspects, if PHY controller 218 does not detect the request from initial slave 204 for initial master 214 to prepare for the half-duplex training (e.g., detecting send_z 506), method 400 may terminate and initial master 214 may return to an active state (e.g., send_idle_data as defined in the IEEE 802.3 standard) and send normal idle signals or data as usual.

If PHY controller 218 detects the request from initial slave 204 for initial master 214 to prepare for the half-duplex training, initial master 214 enters into a master training initiation state (S408). This state may be defined as Wake-Silent, and may be similar to the WakeSilent state as defined in the gigabit EEE standard. When initial master 214 enters this state, PHY controller 218 sends send_z 508 from its local transmitter to initial slave 204. By sending send_z 508, initial master 214 is providing acknowledgment to initial slave 204 that it is preparing to start the half-duplex training. Furthermore, initial master 214 may change its reference clock configuration to be based on timing provided by initial slave 204. In particular, PHY controller 218 may receive idle 510 from initial slave 204 and clock generator 216 may recover Rx clock 520 from a timing of idle 510 and generate Tx clock 522 based on Rx clock 520. In some aspects, clock generator 216 may use a phase select signal from one of its digital phase-locked loops to rotate the phase of its Tx clock 522 so that the frequency of Tx clock 522 may be locked to Rx clock 520. According to certain aspects, this transition may be triggered after PHY controller 218 detects signal energy (e.g., idle 510) from its receive path. In the half-duplex training, it may be assumed that only the new timing loop needs to be updated, and the recovered clock (e.g., Rx clock 520) may be used as a transmitter clock (e.g., Tx clock 522). Furthermore, in the half-duplex training, it may be assumed that other DSP parameters may still be acceptable once the new timing loop is acquired. After the acquisition of the new timing loop, initial master 214 may re-lock its scrambler at its receiver so that this receiver scrambler will be synchronous to the transmitter scrambler of initial slave 204.

According to certain aspects, PHY controller 218 may determine whether the receiver scrambler is locked to be synchronous to the transmitter scrambler of initial slave 204 (S410). If not, method 400 may terminate and initial master 214 may return to the active state. If PHY controller 218 determines that the receiver scrambler is locked to be synchronous to the transmitter scrambler of initial slave 204, PHY controller 218 may assert a local receiver status signal, defined as loc_rcvr_status, as okay and enter into a master training state (S412). This state may be defined as WakeT-raining, and may be similar to the WakeTraining state as defined in the gigabit EEE standard. When initial master 214 enters this state, PHY controller 218 may start to send idle 512 to initial slave 204. In this state, both initial master 214 and initial slave 204 are engaged in the full-duplex training. Furthermore, initial master 214 may continue to keep tracking its recovery clock (e.g., Rx clock 520) and update its DSP parameters as well.

According to certain aspects, PHY controller 218 may receive from initial slave 204 an acknowledgment as to whether initial slave 204 has successfully updated its timing (S414). In some aspects, this acknowledgment may be in the form of a remote receiver status signal defined as rem_rcvr_status that is asserted as okay. If PHY controller 218 does not receive the acknowledgment within a predetermined time, which may be any value, then PHY controller 218 may determine that the training with initial slave 204 was not successful. In such a situation, method 400 may terminate and initial master 214 may return to the active state.

If PHY controller 218 receives the acknowledgment within the predetermined time, PHY controller 218 may switch the timing role of initial master 214 (S416). In such a situation, PHY controller 218 may set PHYC_Timing_CONFIG as 0 for initial master 214. Thus, according to certain aspects, the timing role of initial master 214 may be switched to a timing slave if the synchronization handshake is successful. Initial master 214 may then return to the active state.

According to certain aspects, a timer defined as timing_switch_wait_max (similar to the wake-error timer defined in the gigabit EEE standard), which may have any value, may be used for the whole timing loop switch process. This timer may be started when initial master 214 enters the master training initiation state. If a timeout occurs (e.g., the timer reaches the value of timing_switch_wait_max), method 400 may terminate and initial master 214 may return to the active state.

Figure 6:
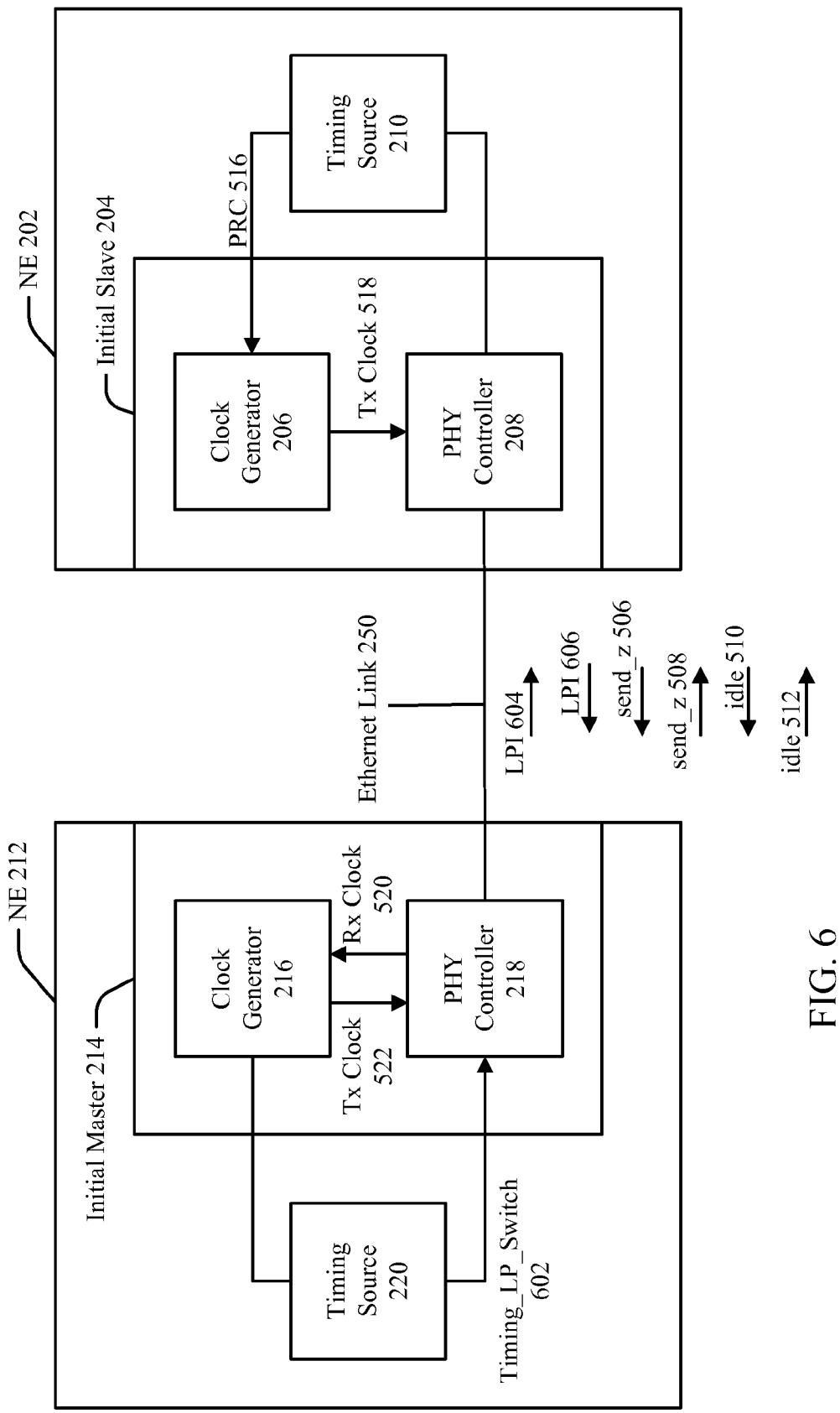
FIG. 6 illustrates an example of communications that occur between network equipment when a switching signal is asserted at an initial master, in accordance with various aspects of the subject technology.

According to various aspects of the subject technology, a similar synchronization handshake may be applied when the switching signal, Timing_LP_Switch, is asserted locally at initial master 214. FIG. 6 illustrates an example of communications that occur between network equipment 202 and 212 when Timing_LP_Switch 602 is asserted locally at initial master 214, in accordance with various aspects of the subject technology. As shown in FIG. 6, timing source 220 provides Timing_LP_Switch 602 to PHY controller 218 (as opposed to timing source 210 providing Timing_LP_Switch 514 to PHY controller 208 in FIG. 5).

According to certain aspects, if PHY controller 218 detects Timing_LP_Switch 602, initial master 214 may engage in a synchronization handshake with initial slave 204 to switch timing roles. According to this handshake, PHY controller 218 determines whether its link partner, initial slave 204, is configured to support bi-directional synchronization propagation. In some aspects, PHY controller 218 may make such a determination by sending LPI signaling (shown in FIG. 6 as LPI 604 and referred to as source LPI signals since these signals originate from initial master 214) to initial slave 204. PHY controller 218 may also enable a timer when LPI 604 is sent. PHY controller 218 may determine that initial slave 204 is configured to support bi-directional synchronization propagation if it receives return LPI signals (shown in FIG. 6 as LPI 606) from initial slave 204 before the timer runs out of time. This signaling may be detected by PHY controller 218 as rem_lpi_req=1, which is similar to EEE symmetric handshaking using LPI. PHY controller 218 may determine that initial slave 204 is not configured to support bi-directional synchronization propagation if it does not receive LPI 606 from initial slave 204 before the timer runs out of time. The time set by the timer may be defined as init_lpi_wait and may be set to any value to provide a timeout. In some aspects, init_lpi_wait may be set to accommodate the round-trip delay of the LPI signals traveling along Ethernet link 250 as well as to accommodate some latency due to the implementation for detecting LPI signals (e.g., 5 µs, 10 µs, etc.).

According to certain aspects, if PHY controller 218 determines that initial slave 204 is not configured to support bi-directional synchronization propagation, the synchronization handshake may terminate. In this situation, PHY controller 218 may stop sending LPI 604 and may set a register bit to inform timing source 220 of this status. Furthermore, both initial master 214 and initial slave 204 may remain in an active state (e.g., send_idle_data as defined in the IEEE 802.3 standard) and send normal idle signals or data as usual.

If PHY controller 218 determines that initial slave 204 is configured to support bi-directional synchronization propagation, initial master 214 enters into the master switching update state. Initial master 214 may continue sending LPI 604 and remain in the master switching update state for the predetermined update time defined as lpi_update_timer, which can be any value greater than lpi_update_timer of initial slave 204 (e.g., 240 µs). As a result, PHY controller 218 is allowed to detect a request from initial slave 204 for initial master 214 to prepare for half-duplex training before lpi_update_timer of initial master 214 expires.

According to certain aspects, if PHY controller 218 does not detect the request from initial slave 204 for initial master 214 to prepare for the half-duplex training (e.g., detecting send_z 506), the synchronization handshake may terminate and initial master 214 may return to the active state. If PHY controller 218 detects the request from initial slave 204 for initial master 214 to prepare for the half-duplex training, initial master 214 enters into the master training initiation state. Once initial master 214 enters this state, the same steps from method 400 may be implemented.

The synchronization handshake may also be implemented by initial slave 204 when Timing_LP_Switch 602 is asserted remotely (e.g., timing source 220 provides Timing_LP_Switch 602 to PHY controller 218 of initial master 214, thereby initiating a synchronization handshake with initial slave 204). According to certain aspects, initial slave 204 may detect a switching signal from initial master 214 to switch its timing role. PHY controller 208 may detect this switching signal as a request from initial master 214 to confirm that initial slave 204 is configured to support bi-directional synchronization propagation. In some aspects, this request includes LPI 604, and may be detected by PHY controller 208 as rem_lpi_req=1. If PHY controller 208 does not detect the switching signal, the synchronization handshake may terminate. In some aspects, if PHY controller 208 does not detect the switching signal, PHY controller 208 may wait a predetermined period of time before attempting to detect the switching signal again.

If PHY controller 208 detects the switching signal, initial slave 204 enters into the slave switching update state. In this state, PHY controller 208 may send LPI 606 as confirmation that it is configured to support bi-directional synchronization propagation and may update one or more DSP blocks to prepare for the upcoming timing loop switch. Initial slave 204 may remain in this state for the predetermined update time (defined as lpi_update_timer and can be any value such as 190 µs).

According to certain aspects, when a timeout occurs for lpi_update_timer, PHY controller 208 may determine if it is still receiving LPI 606, which may be detected as rem_lpi_req=1. If so, initial slave 204 enters into the slave training initiation state. Once initial slave 204 enters this state, the same steps from method 300 may be implemented. Otherwise, the synchronization handshake may terminate and initial slave 204 may return to the active state.

Figure 7:
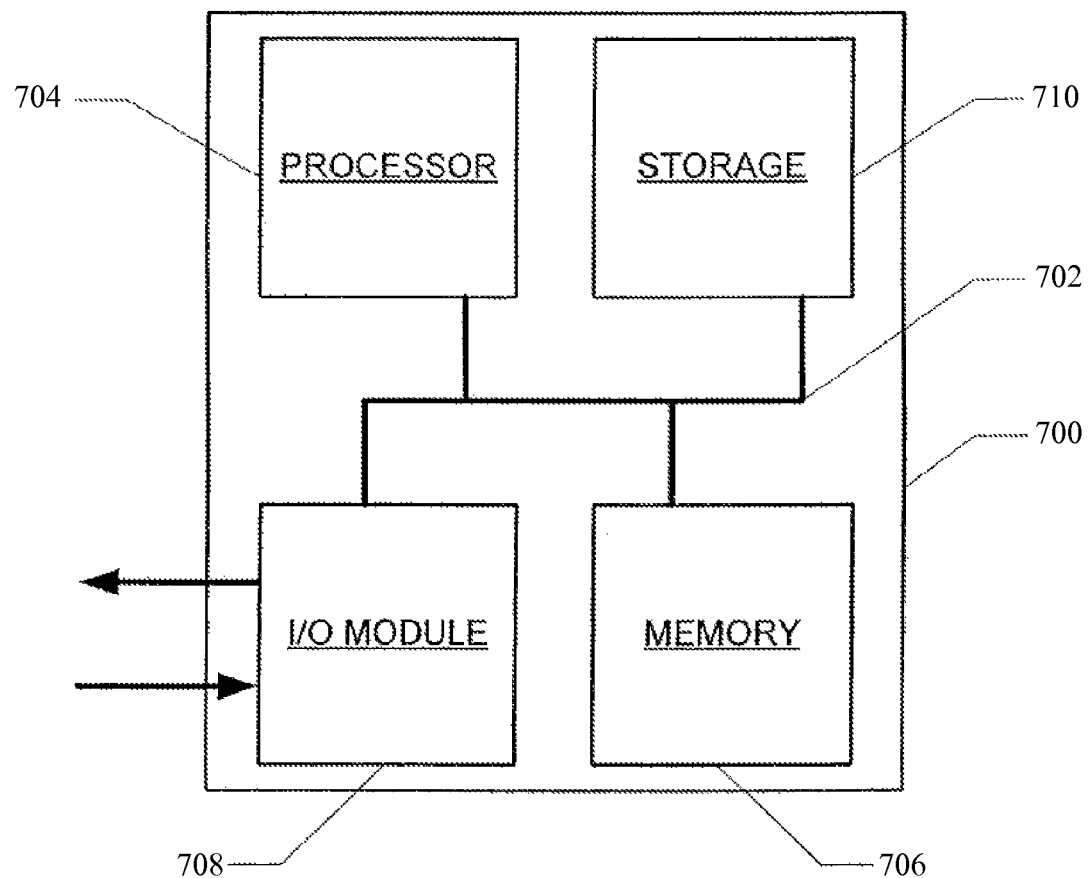
FIG. 7 is a block diagram illustrating components of a controller, in accordance with various aspects of the subject technology.

FIG. 7 is a block diagram illustrating components of controller 700, in accordance with various aspects of the subject technology. Controller 700 comprises processor module 704, storage module 710, input/output (I/O) module 708, memory module 706, and bus 702. Bus 702 may be any suitable communication mechanism for communicating information. Processor module 704, storage module 710, I/O module 708, and memory module 706 are coupled with bus 702 for communicating information between any of the modules of controller 700 and/or information between any module of controller 700 and a device external to controller 700. For example, information communicated between any of the modules of controller 700 may include instructions and/or data. In some aspects, bus 702 may be a universal serial bus. In some aspects, bus 702 may provide Ethernet connectivity.

In some aspects, processor module 704 may comprise one or more processors, where each processor may perform different functions or execute different instructions and/or processes. For example, one or more processors may execute instructions for implementing bi-directional synchronization propagation, and one or more processors may execute instructions for input/output functions.

Memory module 706 may be random access memory ("RAM") or other dynamic storage devices for storing information and instructions to be executed by processor module 704. Memory module 706 may also be used for storing temporary variables or other intermediate information during execution of instructions by processor 704. In some aspects, memory module 706 may comprise battery-powered static RAM, which stores information without requiring power to maintain the stored information. Storage module 710 may be a magnetic disk or optical disk and may also store information and instructions. In some aspects, storage module 710 may comprise hard disk storage or electronic memory storage (e.g., flash memory). In some aspects, memory module 706 and storage module 710 are both a machine-readable medium.

Controller 700 may be coupled via I/O module 708 to a user interface, which may allow a user to communicate information and select commands to controller 700 as well as receive information from controller 700. For example, the user interface may be a monitor (e.g., liquid crystal display (LCD), a light emitting diode (LED) display, an organic light emitting diode (OLED) display, a flexible display, a flat panel display, a solid state display) for displaying information to a user. The user interface may also include, for example, a keyboard, a mouse, or any device with sensory feedback, visual feedback, auditory feedback, and/or tactile feedback coupled to controller 700 via I/O module 708 for communicating information and command selections to processor module 704.

According to various aspects of the subject technology, methods described herein may be executed by controller 700. Specifically, processor module 704 may execute one or more sequences of instructions contained in memory module 706 and/or storage module 710. In one example, instructions may be read into memory module 706 from another machine-readable medium, such as storage module 710. In another example, instructions may be read directly into memory module 706 from I/O module 708, for example from a user via the user interface. Execution of the sequences of instructions contained in memory module 706 and/or storage module 710 causes processor module 704 to perform methods to implement bi-directional synchronization propagation. For example, a computational algorithm for implementing bi-directional synchronization propagation may be stored in memory module 706 and/or storage module 710 as one or more sequences of instructions. Information such as the switching signal, the timing role, the state a communication device may be in, LPI signals, zero signals, clock information, idle signals, and/or other information may be communicated from processor module 704 to memory module 706 and/or storage module 710 via bus 702 for storage. In some aspects, the information may be communicated from processor module 704, memory module 706, and/or storage module 710 to I/O module 708 via bus 702. The information may then be communicated from I/O module 708 to a user via the user interface.

One or more processors in a multi-processing arrangement may also be employed to execute the sequences of instructions contained in memory module 706 and/or storage module 710. In some aspects, hard-wired circuitry may be used in place of or in combination with software instructions to implement various aspects of the subject technology. Thus, aspects of the subject technology are not limited to any specific combination of hardware circuitry and software.

The term "machine-readable medium," or "computer-readable medium," as used herein, refers to any medium that participates in providing instructions to processor module 704 for execution. Such a medium may take many forms, including, but not limited to, non-volatile media and volatile media. Non-volatile media include, for example, optical or magnetic disks, such as storage module 710. Volatile media include dynamic memory, such as memory module 706. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to analyze and control an operation or a component may also mean the processor being programmed to analyze and control the operation or the processor being operable to analyze and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
    detecting, by a communication device, an indication to switch a timing role of the communication device;
    transmitting, by the communication device, a first signal to an other communication device;
    determining, by the communication device, that the other communication device supports switching timing roles when a second signal corresponding to the first signal is received from the other communication device within a threshold amount of time from transmitting the first signal, otherwise determining that the other communication device does not support switching timing roles;
    switching the timing role of the communication device when the other communication device is determined to support switching timing roles; and
    maintaining the timing role of the communication device when the other communication device is determined not to support switching timing roles.

2. The method of claim 1, wherein:
    the other communication device is configured as an initial master,
    the communication device is configured as an initial slave,
    switching the timing role of the communication device comprises designating the timing role of the communication device as a timing master, and the method further comprises:
    engaging a the synchronization handshake that comprises:
        entering, by the communication device, into a slave switching update state for a predetermined update time;
        entering, by the communication device, into a slave training initiation state at a conclusion of the predetermined update time, wherein entering into the slave training initiation state comprises determining whether the other communication device is prepared for duplex training; and
        entering, by the communication device, into a slave training state based on the determination of whether the other communication device is prepared for duplex training.

3. The method of claim 2, wherein entering into the slave switching update state comprises:
    transmitting, from the communication device, one or more source low power idle (LPI) signals to the other communication device; and
    updating one or more digital signal processing blocks of the communication device for switching the timing role of the communication device.

4. The method of claim 2, wherein entering into the slave training initiation state comprises:
    transmitting, from the communication device, one or more source zero signals to the other communication device;
    detecting one or more return zero signals from the other communication device in response to transmission of the one or more source zero signals; and
    determining that the other communication device is prepared for duplex training if the one or more return zero signals are detected.

5. The method of claim 2, wherein entering into the slave training state comprises:
    receiving a primary reference clock from a timing source of the communication device;
    generating a transmit clock based on the primary reference clock;
    transmitting, from the communication device, one or more source idle signals based on the transmit clock;
    detecting one or more return idle signals from the other communication device in response to transmission of the one or more source idle signals; and
    updating a recovery clock of the communication device based on a timing of the one or more return idle signals.

6. The method of claim 1, wherein the other communication device is configured as an initial slave, wherein the communication device is configured as an initial master, and wherein switching the timing role of the communication device comprises designating the timing role of the communication device as a timing slave.

7. The method of claim 6, wherein
    the first signal comprises one or more source low power idle (LPI) signals and the second signal comprises one or more return LPI signals.

8. The method of claim 1, further comprising, when the other communication device is determined to support switching timing roles, engaging in a synchronization handshake that comprises:
    entering, by the communication device, into a master switching update state;
    detecting, in the master switching update state, a duplex training initiation request from the other communication device;
    entering, by the communication device, into a master training initiation state based on the detection of the duplex training initiation request;
    detecting, in the master training initiation state, a duplex training completion request from the other communication device; and
    entering, by the communication device, into a master training state based on the detection of the duplex training completion request.

9. The method of claim 8, wherein entering into the master switching update state comprises:

transmitting, from the communication device, one or more source low power idle (LPI) signals to the other communication device; and detecting, by the communication device, one or more zero signals from the other communication device.

10. The method of claim 8, wherein entering into the master training initiation state comprises:

receiving, by the communication device, one or more source zero signals from the other communication device;

transmitting, to the other communication device, one or more return zero signals in response to receipt of the one or more source zero signals to acknowledge that the communication device is prepared for duplex training;

receiving one or more source idle signals from the other communication device;

generating a recovery clock based on a timing of the received one or more source idle signals;

generating a transmit clock based on the recovery clock; and locking a scrambler at a receiver of the communication device to synchronize with a scrambler at a transmitter of the other communication device based on the generation of the transmit clock.

11. The method of claim 10, wherein entering into the master training state comprises:

transmitting one or more return idle signals to the other communication device in response to locking of the scrambler at the receiver of the communication device; and receiving a timing update verification from the other communication device.

12. The method of claim 1, wherein comprising:

engaging in a second duplex training with the other communication device upon completion of a first duplex training, wherein the switching occurs upon completion of the second duplex training.

13. The method of claim 12, further comprising:

generating a recovery clock based on a timing of signals received from the other communication device; and locking a second scrambler of the communication device to synchronize with a first scrambler of the other communication device based on the generated recovery clock, wherein engaging in the second duplex training is initiated when the second scrambler is locked to be synchronous to the first scrambler.

14. A method comprising:

engaging, by a communication device, in a synchronization handshake with an other communication device over a communication link, wherein engaging in the synchronization handshake comprises:

receiving, by the communication device, a request from the other communication device to confirm that the communication device supports switching timing roles; and transmitting, to the other communication device and within a threshold amount of time from receiving the request, confirmation that the communication device supports switching timing roles in response to the request when the communication device supports switching timing roles, otherwise not responding to the request within the threshold amount of time when the communication device does not support switching timing roles;

switching the timing role of the communication device when the communication device supports switching timing roles; and maintaining the timing role of the communication device when the communication device does not support switching timing roles.

15. The method of claim 14, wherein:

the communication device is configured as an initial master, the other communication device is configured as an initial slave, switching the timing role of the communication device comprises designating the timing role of the communication device as a timing slave, and engaging in the synchronization handshake further comprises:

entering, by the communication device, into a master training initiation state;

detecting, in the master training initiation state, a duplex training completion request from the other communication device; and entering, by the communication device, into a master training state based on the detection of the duplex training completion request.

16. The method of claim 14, wherein:

the communication device is configured as an initial slave, the other communication device is configured as an initial master, switching the timing role of the communication device comprises designating the timing role of the communication device as a timing master, and engaging in the synchronization handshake further comprises:

entering, by the communication device, into a slave training initiation state, wherein entering into the slave training initiation state comprises determining whether the other communication device is prepared for duplex training; and entering, by the communication device, into a slave training state based on the determination of whether the other communication device is prepared for duplex training.

17. A gigabit Ethernet device comprising:

a transmitter; and at least one processor configured to:

detect a switching signal comprising an indication to switch a timing role of the gigabit Ethernet device;

engage in a synchronization handshake with an other gigabit Ethernet device over an Ethernet link based on detection of the switching signal, wherein engaging in the synchronization handshake comprises:

transmitting a handshake signal to the other gigabit Ethernet device;

determining that the other gigabit Ethernet device does not support switching timing roles when the other gigabit Ethernet device does not respond to the handshake signal within a threshold amount of time, otherwise determining that the other gigabit Ethernet device supports switching timing roles;

engaging in duplex training with the other gigabit Ethernet device when the other gigabit Ethernet device is determined to support switching timing roles;

switch the timing role of the gigabit Ethernet device when the other gigabit Ethernet device is determined to support switching timing roles; and maintain the timing role of the gigabit Ethernet device when the other gigabit Ethernet device is determined not to support switching timing roles.

18. The gigabit Ethernet device of claim 17, wherein the handshake signal comprises one or more source low power idle (LPI) signals, the other gigabit Ethernet device is determined to support switching timing roles when one or more return LPI signals are detected within the threshold amount of time, and the one or more source LPI signals and the one or more return LPI signals comply with an IEEE 802.3 energy efficient Ethernet standard for gigabit Ethernet devices.

19. The first gigabit Ethernet device of claim 17, wherein the at least one processor is further configured to:

receive an acknowledgment indicating that the other gigabit Ethernet device has successfully updated timing associated with the other gigabit Ethernet device, wherein completion of the duplex training occurs when the acknowledgment is received.

20. The gigabit Ethernet device of claim 17, wherein the at least one processor is further configured to:

during the duplex training, update a recovery clock of the gigabit Ethernet device based on a timing of signals received from the other gigabit Ethernet device.

* * * * *